United States Patent
Hirotsune et al.

(10) Patent No.: US 9,472,228 B2
(45) Date of Patent: *Oct. 18, 2016

(54) PERPENDICULAR MAGNETIC RECORDING MEDIA HAVING NOVEL MAGNETIC UNDER-LAYER STRUCTURE

(71) Applicant: HGST Netherlands B.V., Amsterdam (NL)

(72) Inventors: Akemi Hirotsune, Odawara (JP); Ikuko Takekuma, Yokohama (JP); Hiroyuki Matsumoto, Chigasaki (JP); Oleksandr Mosendz, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 150 days.

This patent is subject to a terminal disclaimer.

(21) Appl. No.: 13/903,849

(22) Filed: May 28, 2013

(65) Prior Publication Data

US 2014/0355156 A1    Dec. 4, 2014

(51) Int. Cl.
G11B 5/73    (2006.01)

(52) U.S. Cl.
CPC .................... G11B 5/7325 (2013.01)

(58) Field of Classification Search
None
See application file for complete search history.

(56) References Cited

U.S. PATENT DOCUMENTS

| | | | |
|---|---|---|---|
| 6,863,998 B2 | 3/2005 | Koda et al. | |
| 7,405,011 B2 | 7/2008 | Stipe et al. | |
| 7,431,999 B2 | 10/2008 | Iwasaki et al. | |
| 7,494,726 B2* | 2/2009 | Watanabe et al. | 428/831.2 |
| 7,869,162 B2 | 1/2011 | Lu et al. | |
| 7,892,664 B2 | 2/2011 | Lu | |
| 7,989,097 B2* | 8/2011 | Maeda | 428/831.2 |
| 8,509,039 B1* | 8/2013 | Huang | G11B 5/65 369/13.02 |
| 8,795,765 B2 | 8/2014 | Koike et al. | |
| 2003/0118867 A1 | 6/2003 | Koda et al. | |
| 2005/0202287 A1 | 9/2005 | Lu et al. | |
| 2008/0311430 A1 | 12/2008 | Chen et al. | |
| 2011/0205862 A1 | 8/2011 | Kanbe et al. | |
| 2012/0052330 A1 | 3/2012 | Takekuma et al. | |
| 2012/0113768 A1 | 5/2012 | Kanbe et al. | |
| 2012/0171369 A1 | 7/2012 | Koike et al. | |

(Continued)

FOREIGN PATENT DOCUMENTS

| | | | |
|---|---|---|---|
| JP | 2003173511 A | 6/2003 | |
| JP | 2004022138 A | 1/2004 | |
| JP | 2004280944 A | 10/2004 | |

(Continued)

OTHER PUBLICATIONS

Jeong et al., "Controlling the Crystallographic Orientation in Ultrathin L10 FePt (111) Films on MgO (111) Underlayer," Jul. 2001 IEEE, IEEE Transactions on Magnetics, vol. 37, No. 4, pp. 1268-1270.

(Continued)

Primary Examiner — Holly Rickman
(74) Attorney, Agent, or Firm — Zilka-Kotab, PC

(57) ABSTRACT

A magnetic medium for perpendicular magnetic data recording having improved corrosion characteristics and reduced surface roughness. The magnetic medium includes an under-layer and a perpendicular magnetic recording layer formed over the under-layer. The under-layer can be formed of MgO and has an oxygen concentration that is greater at the perpendicular magnetic recording layer than it is away from the perpendicular magnetic recording layer.

17 Claims, 14 Drawing Sheets

| | O concentration in Underlayer | (001) texture | Surface roughness |
|---|---|---|---|
| Comparative example 3 | UL1(O-lean)/UL2(O-rich)/UL3(O-lean) | O | x |
| Comparative example 4 | UL1(O-rich)/UL2(O-lean)/UL3(O-rich) | x | O |
| Comparative example 5 | UL1(O-rich)/UL2(O-lean) | x | x |
| Embodiment | UL1(O-lean)UL2(O-rich) | O | O |

(56) References Cited

U.S. PATENT DOCUMENTS

2013/0314815 A1\* 11/2013 Yuan et al. .............. 360/59
2014/0093748 A1\* 4/2014 Chen et al. .............. 428/831

FOREIGN PATENT DOCUMENTS

| JP | 2006048904 A | 2/2006 |
|---|---|---|
| JP | 2006085742 A | 3/2006 |
| JP | 2008091024 A | 4/2008 |
| JP | 2008511946 A | 4/2008 |
| JP | 2010272182 A | 12/2010 |
| JP | 2012048784 A | 3/2012 |
| JP | 2012221535 A | 11/2012 |

OTHER PUBLICATIONS

Hu et al., "Exchange Coupling Assisted FePtC Perpendicular Recording Media," IEEE Transactions on Magnetics, vol. 44, No. 11, Nov. 2008, pp. 3547-3549.

Weller et al., "High Ku Materials Approach to 100 Gbits/in2," IEEE Transactions on Magnetics, vol. 36, No. 1, Jan. 2000, pp. 10-15.

\* cited by examiner

| | (001) texture | $\Delta\theta_{50}$ (deg.) |
|---|---|---|
| Comparative example 1 | ○ | 6.0 |
| Comparative example 2 | × | - |
| Embodiment | ○ | 5.2 |

FIG. 3

| | O concentration in Underlayer | (001) texture | Surface roughness |
|---|---|---|---|
| Comparative example 3 | UL1(O-lean)/UL2(O-rich)/UL3(O-lean) | ○ | × |
| Comparative example 4 | UL1(O-rich)/UL2(O-lean)/UL3(O-rich) | × | ○ |
| Comparative example 5 | UL1(O-rich)/UL2(O-lean) | × | × |
| Embodiment | UL1(O-lean)UL2(O-rich) | ○ | ○ |

FIG. 11

| | O concentration in Underlayer | (001) texture | Surface roughness |
|---|---|---|---|
| Embodiment 3 | UL1(O-lean)/UL2(O-middle)/UL3(O-rich) | ○ | ○ |
| Embodiment 4 | UL1(O-lean)/UL2(O-lower middle)/UL3(O-middle)/UL4(O-rich) | ○ | ○ |
| Embodiment 1 | UL1(O-lean)/UL2(O-rich) | ○ | ○ |
FIG. 12a
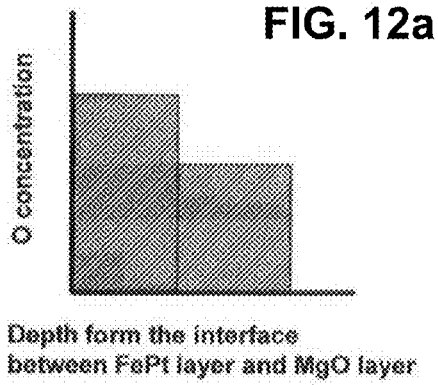
FIG. 12b
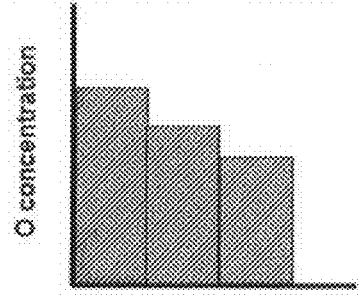
FIG. 12c
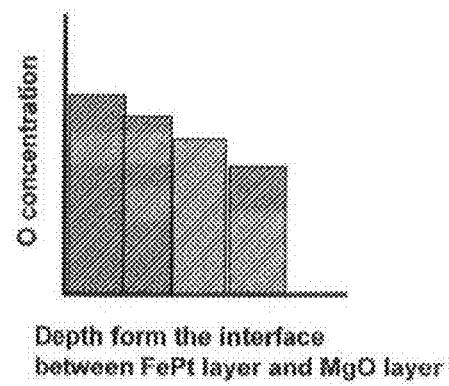
FIG. 12d

PERPENDICULAR MAGNETIC RECORDING MEDIA HAVING NOVEL MAGNETIC UNDER-LAYER STRUCTURE

FIELD OF THE INVENTION

The present invention relates to perpendicular magnetic data recording, and more particularly to a magnetic recording medium having a surface recording density of 1 terabyte per square inch or greater and to a magnetic recording device employing such a magnetic recording medium.

BACKGROUND

In order to achieve higher surface recording density while maintaining thermal stability, a magnetic recording layer is necessary that has a high perpendicular magnetic anisotropy energy $K_u$. $L1_0$-ordered FePt alloy is a material having higher perpendicular magnetic recording anisotropy energy $K_u$ than the currently employed CoCrPt-based alloys, and has thus has attracted attention as a material for next-generation magnetic recording layers. An example is described in Laid-open Japanese Patent Application Number 2008-91024.

In order to employ such $L1_0$-ordered FePt alloy as a magnetic recording layer, it is necessary to reduce the exchange interaction between crystal lattices. In recent years, as disclosed in for example Patent Reference 1 there have been reports of attempts to achieve granularization by addition of non-magnetic material such as $SiO_2$ or C to the $L1_0$-ordered FePt alloy. In this context, granularization means that the magnetic crystal grains are magnetically divided by producing a structure wherein magnetic crystal grains made of FePt are separated from one another by crystal grain boundaries of non-magnetic material that surround the magnetic grains.

In order to employ FePt alloy having $L1_0$ type crystal structure in a magnetic recording layer, it is necessary to perform (001) crystal orientation of the FePt layer. In this regard, it is widely known that (001) crystal orientation can be performed by employing a suitable material as the under-layer formed below the FePt layer. Laid-open Japanese Patent Application Number 2012-48784 discloses an FePt layer having (001) crystal orientation, due to the use of a MgO under-layer. Also, in order to perform (001) crystal orientation by ordering of the FePt, it is necessary to heat the structure to at least 300° C.

In order to employ an FePt alloy having an $L1_0$ type crystal structure in a magnetic recording layer, it is necessary to form a MgO under-layer and to perform (001) crystal orientation by heating the FePt layer thereon. Consequently, if roughness is thereby produced in the under-layer surface, this roughness is enhanced in the FePt layer surface with the result that considerable roughness is produced. If such surface roughness is large, the flyability characteristics are degraded, with the result that good flyability characteristics can be maintained over a long period. In FePt alloy media having an $L1_0$ type crystal structures such as have been employed up to the present, corrosion resistance has been a problem, chiefly for the reasons described above, and this needs to be solved.

SUMMARY

A magnetic medium is described for perpendicular magnetic data recording that includes an under-layer and a magnetic recording layer formed over the under-layer, wherein the under-layer has a higher oxygen concentration closer to the magnetic recording layer and a lower oxygen concentration away from the magnetic recording layer.

The under-layer can include a first layer of MgO and a second layer of MgO with the second layer of MgO being located between the first layer of MgO and the magnetic recording layer and wherein the second layer of MgO has a higher concentration of oxygen than the first layer of MgO. The second layer of MgO can have an oxygen concentration that is 1 to 5 atomic percent greater than the first layer of MgO.

A perpendicular magnetic recording medium according to an embodiment can be formed as layers successively laminated on a substrate and can include least a buffer layer having a non-crystalline or bcc crystal structure, an under-layer made of MgO, a perpendicular magnetic recording layer having an $L1_0$ type crystal structure, and a protective layer, the under-layer being constructed as described above.

Roughness of the under-layer surface is reduced, making it possible to reduce surface roughness of the FePt magnetic recording layer. In this way, corrosion resistance is improved and degradation of the flyability characteristics over a long period can be prevented. Also, the crystal orientation is improved by the improvements in the under-layer structure.

These and other features and advantages will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of the embodiments, as well as the preferred mode of use, reference should be made to the following detailed description read in conjunction with the accompanying drawings which are not to scale.

FIG. 3: shows a summary of results with regard to FePt crystal orientation in the perpendicular magnetic recording media of Embodiment 1 and comparative examples 1, 2.

FIG. 11: shows the construction of the under-layer and the evaluation results in respect of FePt (001) crystal orientation and surface roughness of the perpendicular magnetic recording media of Embodiment 1 and comparative examples 3-5.

FIG. 12(a): shows the construction of the under-layer and the evaluation results with respect to FePt (001) crystal orientation and surface roughness of the perpendicular magnetic recording media of Embodiments 1, 3 and 4.

FIG. 12(b): shows diagrammatically the change of oxygen concentration in the under-layer of Embodiment 1.

FIG. 12(c): shows diagrammatically the change of oxygen concentration in the under-layer of Embodiment 3.

FIG. 12(d): shows diagrammatically the change of oxygen concentration in the under-layer of Embodiment 4.

DETAILED DESCRIPTION

The following description is of the best embodiments presently contemplated. This description is made for the purpose of illustrating the general principles and is not meant to limit the inventive concepts claimed herein.

Embodiment 1

Figure 1:
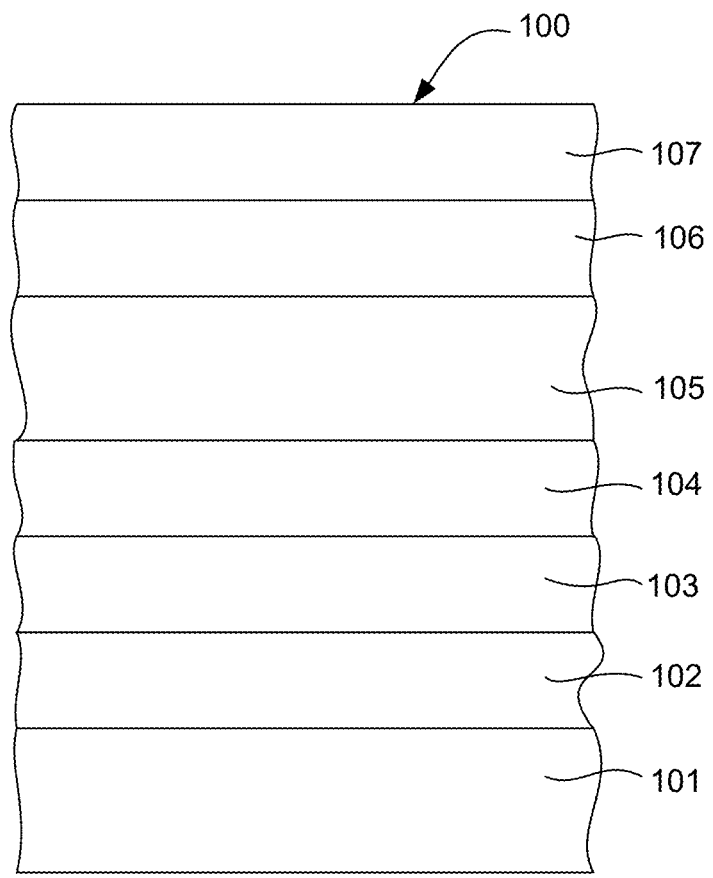
FIG. 1: is a view showing an example of the cross-sectional structure of a perpendicular magnetic recording medium according to Embodiment 1.

The construction of a perpendicular magnetic recording medium 100 is illustrated in FIG. 1. On a substrate 101, the perpendicular magnetic recording medium 100 includes: a buffer layer 102, an under layer structure 108 that can include a first under-layer 103 made of MgO of lower oxygen concentration and a second under-layer 104 made of MgO of higher oxygen concentration, a perpendicular magnetic recording layer 105, an overcoat layer 106, and a lubricant layer 107.

Various materials can employed as the substrate 101, such as for, example, chemically strengthened glass, crystallized glass, Si, or thermally oxidized Si. For the buffer layer 102, a non-crystalline Ni alloy can be employed whose chief constituent is Ni and which contains at least one element of Nb and Ta. The amount of Nb added to the Ni is preferably in the range at least 20 atomic % but less than 70 atomic %; the amount of Ta is preferably in the range at least 30 atomic % but less than 60 atomic %. Apart from this, Zr may be added thereto.

As the perpendicular magnetic recording layer 105, an alloy can be employed having an $L1_0$ crystalline structure and whose chief constituent is FePt having grain boundaries made of a non-magnetic material such as C, carbide, nitride or oxide. Also, elements comprising Ag, Au or Cu may be added with the object of reducing the ordering temperature in the perpendicular magnetic recording layer. The overcoat 106 can be a material having a high hardness such as carbon. A lubricant layer 107 can be provided on top of the overcoat layer 106.

Various types of thin film deposition technologies employed in the creation of semiconductors or magnetic or optical recording media can be used for the formation of the various layers laminated on the substrate 101. Such thin film forming techniques can include DC magnetron sputtering, RF magnetron sputtering or Molecular Beam Epitaxi (MBE). Of these, a sputtering method is preferred because of its suitability to mass production wherein the speed of film manufacture is comparatively high, and which makes possible the formation of a fine structure of the thin film and that provides the ability to control the film thickness distribution.

As an embodiment, FIG. 1 shows diagrammatically the construction of a perpendicular magnetic recording medium having a first under-layer 103 made of MgO of lower oxide concentration and a second under-layer 104 made of MgO of higher oxygen concentration formed on the first under-layer 103. According to one possible embodiment, on the substrate 101, there are successively formed: a buffer layer 102 formed of a $Ni_{62}Ta_{38}$ layer of about 100 nm; a first under-layer 103 formed of a MgO layer of lower oxygen concentration and having a thickness of about 6 nm formed over the buffer layer 102; a second under-layer 104 formed of a MgO layer of higher oxygen concentration and having a thickness of about 6 nm formed over the first under-layer 103; a magnetic recording layer 105 whose average composition is $(Fe_{45}Pt_{45}Ag_{10})_{70}(SiO_2)_{30}$, having a thickness of about 10 nm; and overcoat formed of a C layer having a thickness of about 3 nm formed over the recoding layer 104. Film formation can be performed using respectively DC sputtering or RF sputtering. After this, a lubricant layer 107 having a thickness of about 1 nm can be applied onto the C overcoat layer 106.

Also, regarding the first under-layer 103 and the second under-layer 104, an MgO target was employed so as to make the oxygen concentration in the first film 103 lower than that of the second layer 104. One way in which to raise the oxygen concentration in the second under-layer film 104, is to add a small or trace amount of oxygen to the sputter deposition atmosphere during film formation. In this way, the oxygen concentration of the second under-layer can be higher than that of the first under-layer. Another way to raise the oxygen concentration of the second layer 104 relative to the first layer 103 could be to employ two MgO targets, namely, a first MgO target of lower oxygen concentration to be employed during deposition of the first layer 103 and a second MgO target of higher oxygen concentration to be employed during deposition of the second layer 104. Irrespective of the method of manufacture, it is desired that a difference in the oxygen concentration is produced in the under-layers that are thereby formed.

Comparative example 1 and comparative example 2, are illustrated with reference to FIGS. 13a and 13b in which the under-layer is a single layer. As for comparison example 1, FIG. 13 illustrates diagrammatically an example of the construction of a perpendicular magnetic recording medium 1300 having only an under-layer 1302 that is a single layer having a lower oxygen concentration. On a substrate 101, are successively formed: a $Ni_{62}Ta_{38}$ layer of about 100 nm constituting a buffer layer 102; a MgO layer of about 12 nm constituting a first lower layer 1302; a magnetic recording layer 105 of about 10 nm of average composition $(Fe_{45}Pt_{45}Ag_{10})_{70}(SiO_2)_{30}$, and a C layer of about 3 nm constituting an overcoat layer 107. Film deposition can be by DC sputtering or RF sputtering. After this, lubricant 108 can be applied in the amount of about 1 nm onto the C layer.

Figure 13A:
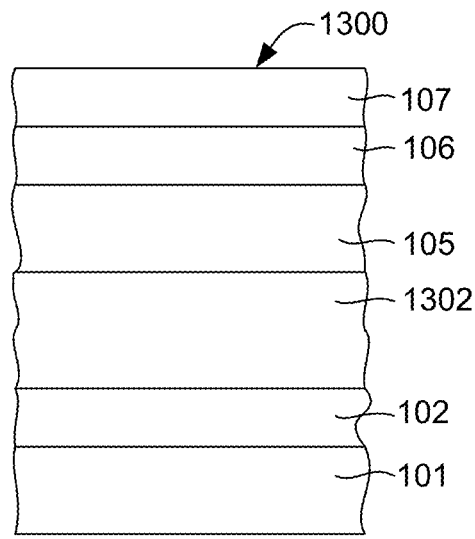
FIGS. 13a and 13b: are views showing an example of the cross-sectional structure of a perpendicular magnetic recording medium of comparative examples 1 and 2.
Figure 13B:
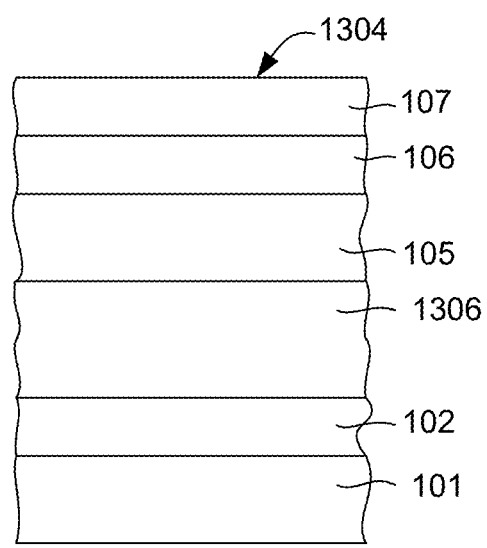
Figure 14A:
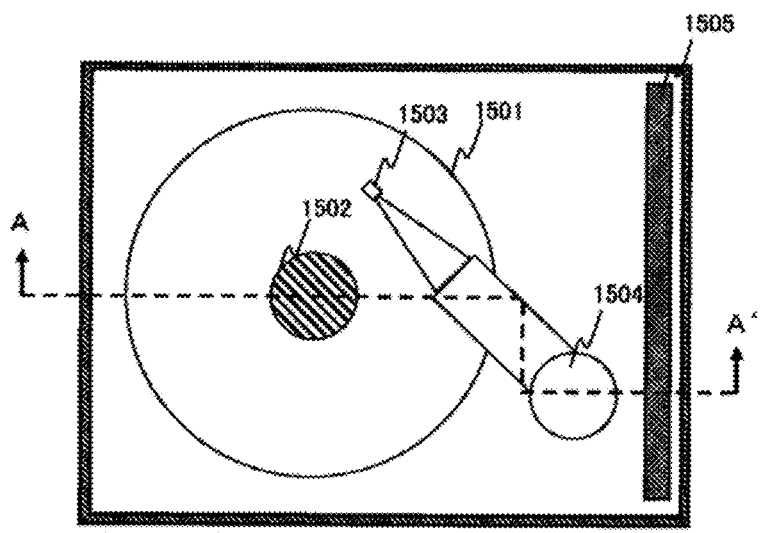
FIGS. 14(a)-14(d): show various views illustrating an example of a magnetic data storage system.
Figure 14B:
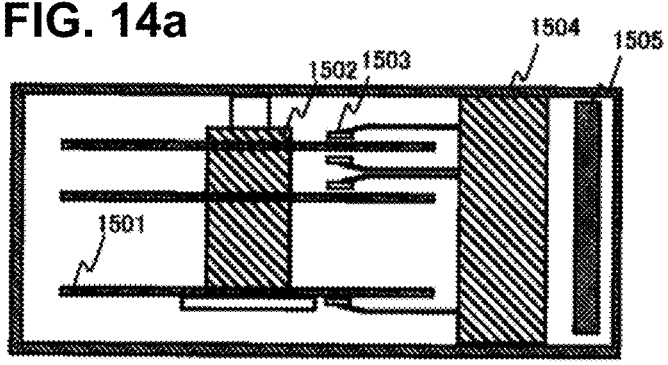
Figure 14C:
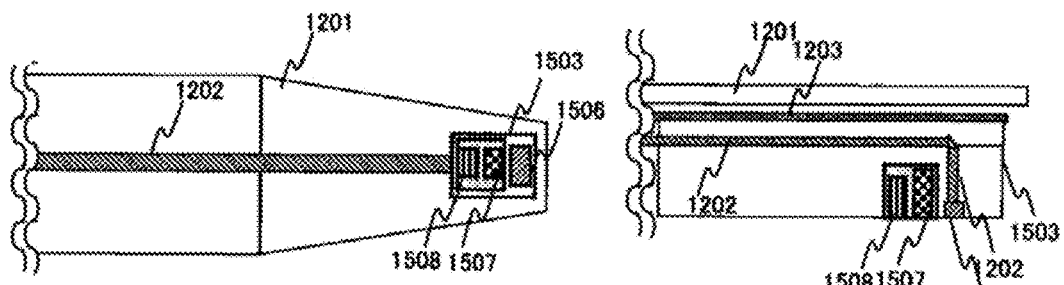
Figure 14D:
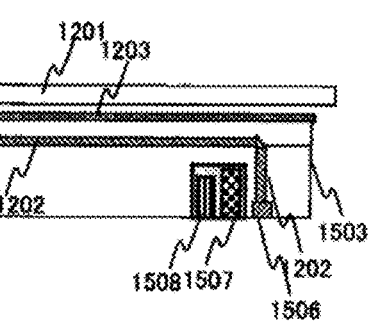

Comparative example 2 is shown with reference to FIG. 13b, which illustrates a perpendicular magnetic recording medium 1304 having only an under-layer 1306 having a higher oxygen concentration. Otherwise, comparative example 2 (FIG. 13b) is similar to comparative example 1 (FIG. 13a).

Figure 2:
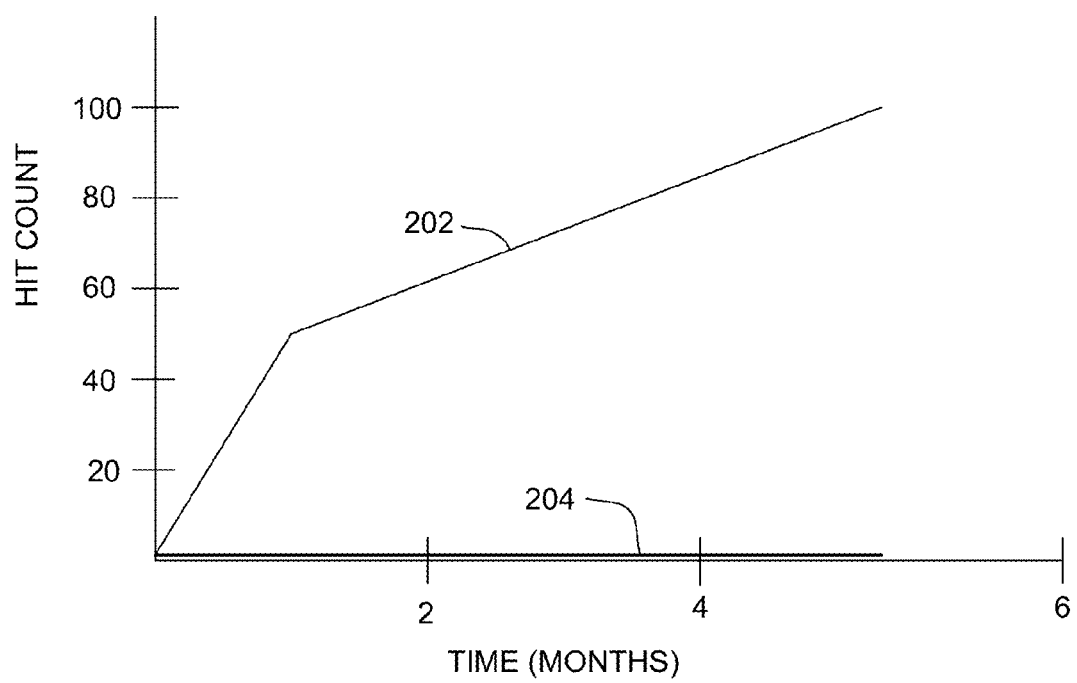
FIG. 2: shows evaluation of the fly height characteristics over a long period of storage of the perpendicular magnetic recording medium of Embodiment 1 and a comparative example.

FIG. 2 shows the results of investigating the flyability characteristics over a long period of storage of a recording media according to an embodiment (e.g. media 100 of FIG. 1) as compared with the comparative examples (media 1302, 1306 of FIGS. 13a and 13b). The vertical axis shows the number of times in which a head hit occurred due for example to a projection generated on the surface of the medium, when the flyability characteristics were ascertained by a glide test. Line 202 indicates the number of hits over time for a comparative example, whereas line 204 indicates the number of hits (essentially flat at zero) for a media according to an embodiment. In media with poor corrosion characteristics, metallic elements present in the film diffuse to the vicinity of the film surface over a long period of storage, forming surface irregularities which can cause contact with the slider and magnetic head during operation (i.e. "hits"). In other words, in media having good corrosion characteristics, such change does not occur and hits are not produced. From these results, it can be understood that changes over time in the case of comparative example 1 (FIG. 13a, 1302) and comparative example 2 (FIG. 13b 1306) cause elevation of the hit count and poor corrosion characteristics. In contrast, in the embodiment (FIG. 1, 100), the hit count is unchanged, at zero, even over time, and corrosion characteristics are improved. In this way, the durability of the flyability characteristics is very greatly improved. An X-ray diffraction apparatus was employed for evaluation of the crystal orientation.

Figure 4A:
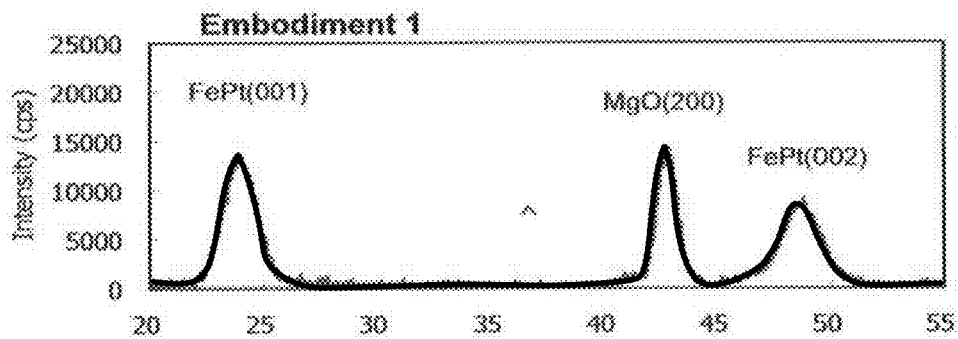
FIGS. 4a-4c: show evaluation results of X-ray diffraction peaks in the perpendicular magnetic recording media of Embodiment 1 and comparative examples 1, 2.
Figure 4B:
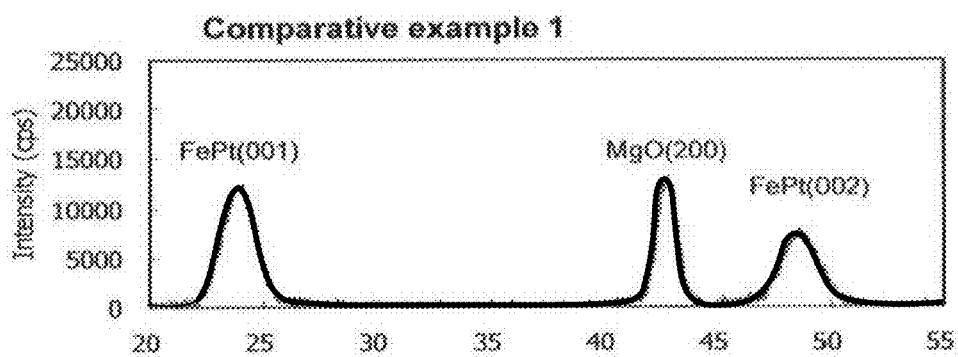
Figure 4C:
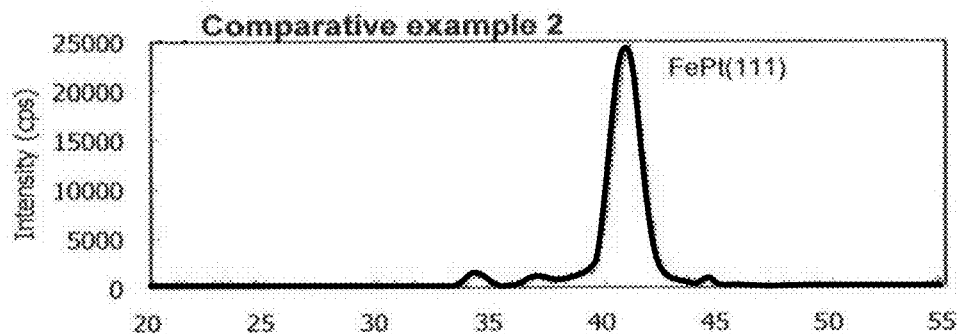

FIG. 3 shows the results of an investigation of FePt crystal orientation with respect to the embodiment (FIG. 1, 100) and the comparative examples 1 and 2 (FIGS. 13a and 13b, 1304, 1306). FIGS. 4a-4c show a comparison of the X-ray diffraction peaks thereof. In order to investigate the crystal orientation of the FePt grains and under-layer, the FePt (001), FePt (002), FePt (111) and MgO (200) diffraction peak intensities are compared. In addition, 2θ is found from the FePt (002) and MgO (200) diffraction peaks, and the half width (Δθ50) of the rocking curve thereof is employed for evaluation. Crystal orientation of the under-layer is better as the MgO (200) peak intensity becomes larger and as Δθ50 becomes smaller. Better ordering of the FePt is displayed as the (001) and (002) peak intensity ratio ($I_{001}/I_{002}$) becomes larger. Also, better crystal orientation is displayed as the FePt (001) and FePt (002) intensities become larger and the Δθ50 of the FePt (002) become smaller. In contrast, the FePt (111) peak indicates the presence of crystals that are inclined from the perpendicular plane, signifying poor ordering and crystal orientation. In the case of the medium of comparative example 1, although the Δθ50 is inferior, at 6°, to that of the embodiment 100 (FIG. 1), fairly good crystal orientation results are obtained. In the case of comparative example 2, crystal orientation is poor and no (001) crystal orientation peak can be detected: instead, a peak of (111) crystal orientation is detected. From this, it can be seen that the FePt is unordered. In the case of the embodiment 100 (FIG. 1), the Δθ50 was 5.2° and crystal orientation is excellent.

Figure 5:
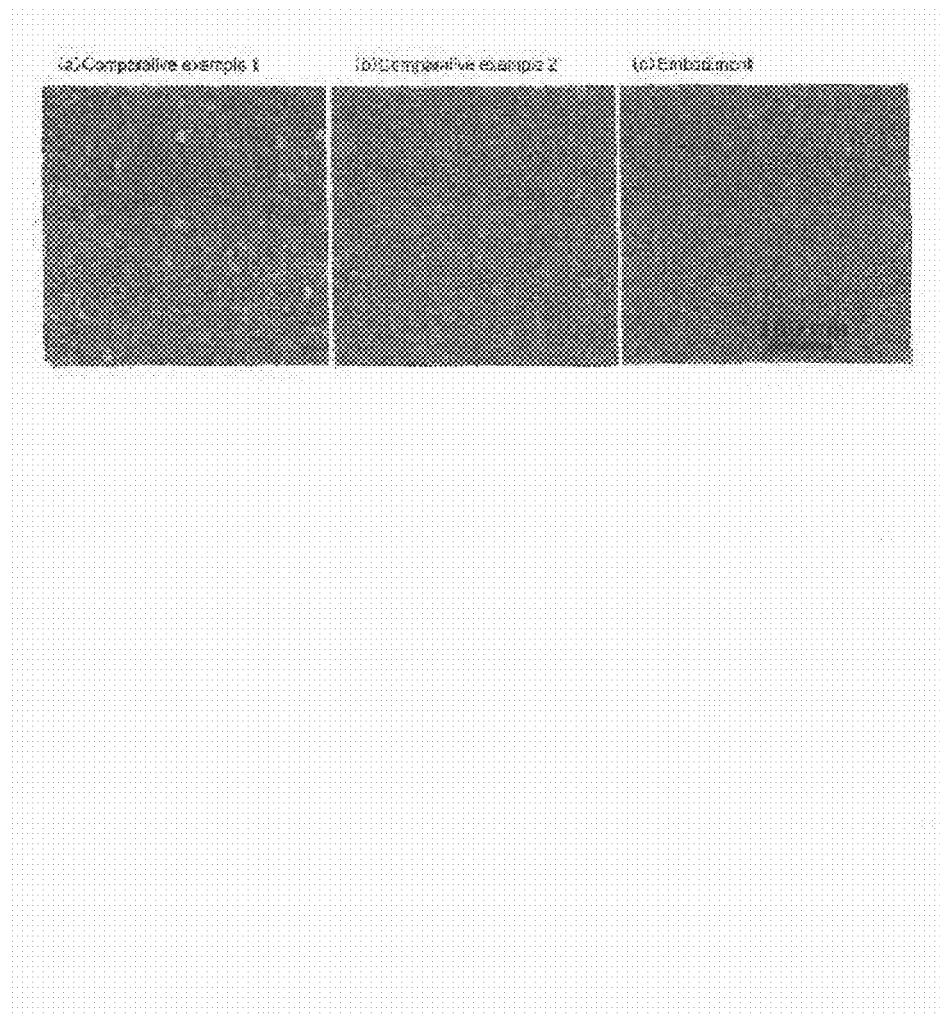
FIG. 5: shows an evaluation results of surface roughness in the perpendicular magnetic recording media of Embodiment 1 and comparative examples 1, 2.

FIG. 5 shows a comparison of the surface roughness results in the embodiment 100 (FIG. 1) and comparative examples 1 and 2. In the case of the medium of comparative example 1, projections of a few nm to about 20 nm are produced from the surface and the overall roughness is therefore poor. In the case of comparative example 2, an extremely smooth surface condition is obtained. A smooth surface condition is also obtained in the case of the embodiment 100 (FIG. 1).

Summarizing these results, in the case of an under-layer made of MgO of lower oxygen concentration, although crystal orientation is good, projections are produced at the surface, resulting in high roughness. In the case of an under-layer made of MgO of higher oxygen concentration, surface roughness is extremely superior, but crystal orientation is degraded. It can be concluded that, with a perpendicular magnetic recording medium having a first under-layer 103 made of MgO of lower oxygen concentration and a second under-layer 104 made of MgO of higher oxygen concentration, as in the media 100 of FIG. 1, excellent crystal orientation and low surface roughness as well as high corrosion resistance can be achieved.

Figure 6:
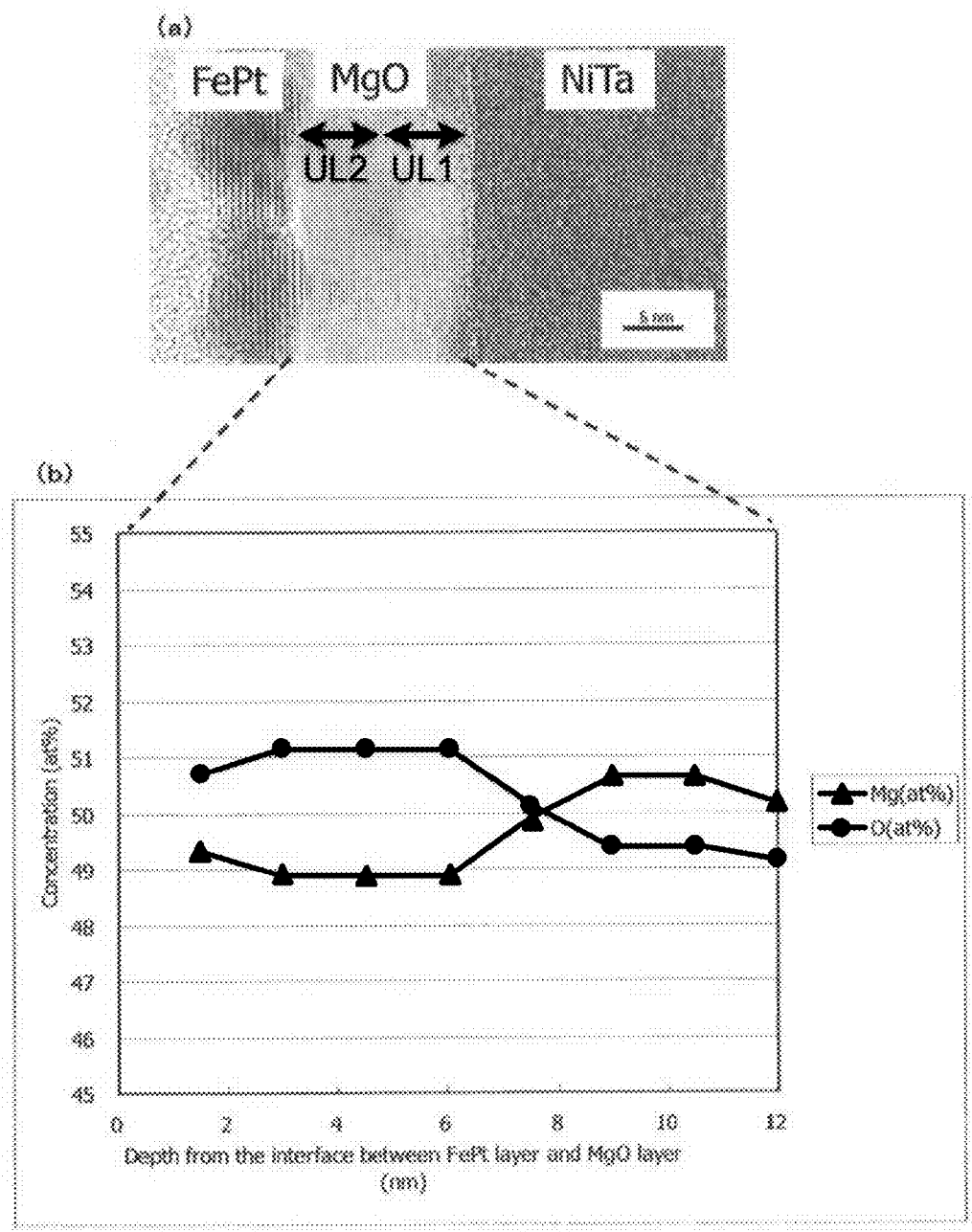
FIG. 6: shows a cross-sectional structure as found by a transmission electron microscope observation of a medium including a second under-layer 104 (UL2) from the first under-layer 103 (UL1) of the perpendicular magnetic recording medium of Embodiment 1 and shows the results of examination of the composition ratios of Mg and O by high resolution Rutherford back scattering in regard to the under-layer in the perpendicular magnetic recording medium.

FIG. 6 shows a cross-section of the structure as observed by a transmission electron microscope, of a medium containing the under-layer structure 108 of FIG. 1. As can be seen from these results, a MgO (100) crystal layer is formed continuously from the first under-layer 103 to the second under-layer 104. FIG. 6 shows the results of an investigation of the composition ratio of these MgO layers, performed using a high-resolution Rutherford back scattering method. The horizontal axis shows the distance from the interface of the FePt layer and the MgO layer and the vertical axis shows the concentrations of Mg and O. From this, it can be seen that the oxygen concentration in the second under-layer 104 (UL2) on the FePt side is relatively high, whereas the oxygen concentration in the first under-layer 103 (UL1) is relatively low.

Figure 7:
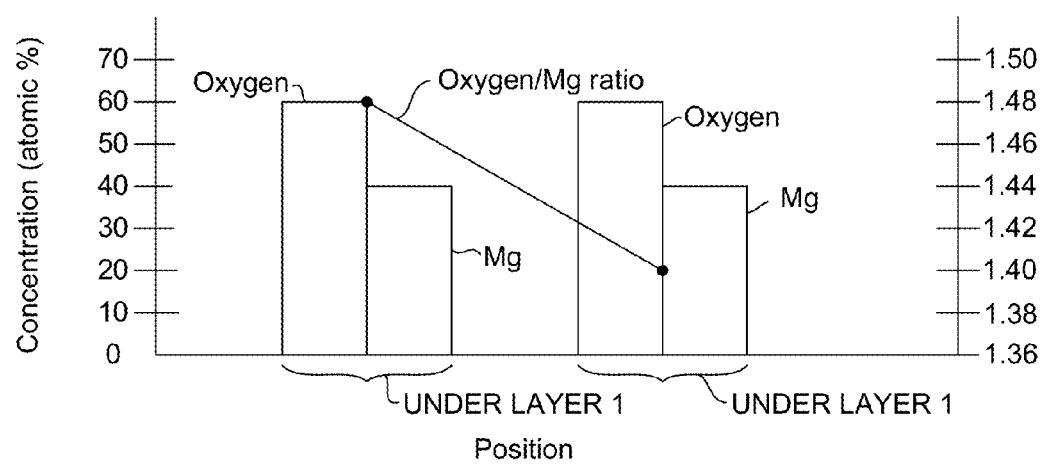
FIG. 7: shows the results of examination of the composition ratios of Mg and O obtained by photoelectron spectroscopy (XPS), in respect of the under-layer of the perpendicular magnetic recording medium of Embodiment 1.

FIG. 7 shows a comparison of the composition ratios of Mg and O using the photoelectron spectroscopy method (XPS). In XPS, the sensitivity is different for each element depending on the composition, so there is a considerable discrepancy from the actual composition ratios. Consequently, although comparison with the absolute values is difficult, a relative comparison of composition ratios can be achieved. In this way, it can be found that the ratio of oxygen (O) and magnesium (Mg) is relatively larger in the case of the second under-layer 104 (UL2) than in the case of the first under-layer 103 (UL1).

From the above, it can be seen that if there is a concentration difference of about 2% in terms of average values of the oxygen and magnesium in each layer, particularly superior results are obtained. Even with an average concentration difference of 1% in each layer, a roughness decreasing effect, a crystal orientation improving effect, and a corrosion resistance improving effect are obtained. However, if the concentration difference of the oxygen and magnesium is too large, the adverse effects appear that the film density of the MgO layer is lowered or the roughness increases: it is therefore desirable that the average concentration difference should be less than 5 atomic percent or 1 to 5 atomic percent.

The perpendicular magnetic recording medium 100 (FIG. 1) can be created using an in-line high-speed sputtering device. This device can include a plurality of film-forming process chambers, dedicated heating chambers, and substrate introduction/discharge chambers, which can be independently evacuated. All the chambers can be evacuated to vacuum of below $1 \times 10^{-4}$ Pa, and the deposition can be performed by moving a carrier on which the substrate is mounted into each process chamber. Heating of the substrate can be performed in the dedicated heating chamber and the temperature during heating can be controlled by adjusting the power supplied to the heater and varying the heating time. Temperature control may be performed by PID control by providing a thermocouple.

An atomic force microscope can be employed to evaluate the surface roughness. The indices adopted for roughness evaluation can be the centerline average roughness (Ra) and the mean square surface roughness (Rq).

Embodiment 2

Figure 8A:
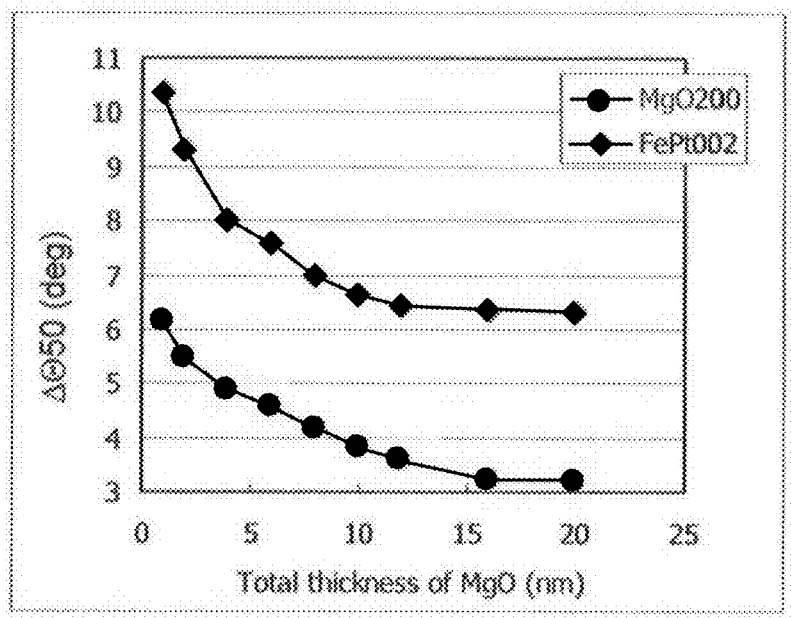
FIGS. 8a and 8b show the results of examination of the crystal orientation Δθ50 (FIG. 8a) and the surface roughness (FIG. 8b), when the total film thickness of the first under-layer 103 and the second under-layer 104 are varied with respect to the under-layer of the perpendicular magnetic recording medium of Embodiment 2.
Figure 8B:
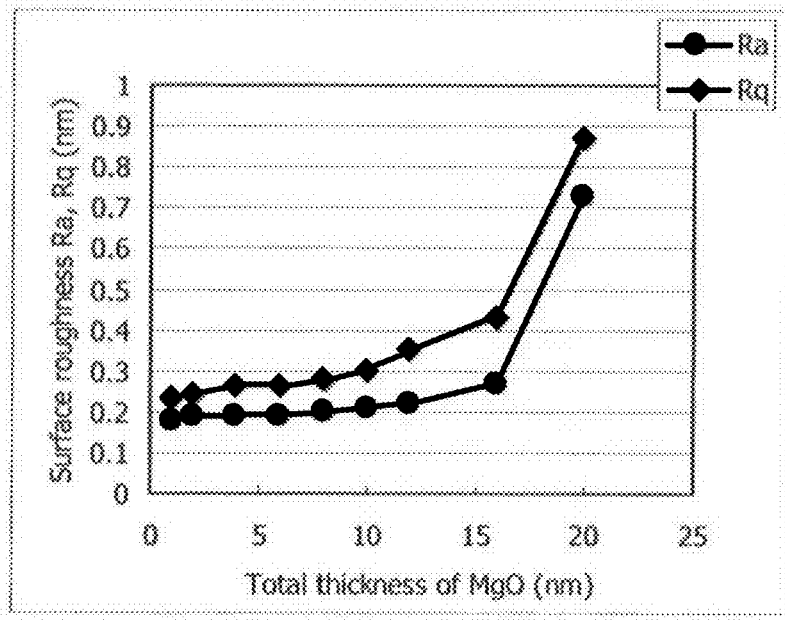

With reference again to FIG. 1, the thicknesses of the first and second under-layers 103, 104 can be varied. FIG. 8 shows the results obtained when (a) the crystal orientation Δθ50 and (b) the surface roughness are examined, in the case where the total film thickness of the first under-layer 103 and the second under-layer 104 are varied while keeping the film thickness ratio of the first under-layer 103 and the second under-layer 104 at about 1:1. In this way, it was found that the total film thickness of the first under-layer 103 and the second under-layer 104 have an important effect on the characteristics of the media 100. Excellent characteristics can be obtained if the total film thickness of the MgO layers 103, 104 is at least 2 nm but less than 16 nm, in that the MgO crystal orientation is less than 5.5°, the FePt crystal orientation is less than 9.4° and the roughness of the MgO surface is Rq is less than 0.44 nm. Furthermore, excellent characteristics can be obtained if the total film thickness of the MgO layers 103, 104 is at least 4 nm but less than 12 nm, in that the MgO crystal orientation is less than 5°, the FePt crystal orientation is less than 8° and the roughness of the MgO surface is Rq is less than 0.35 nm.

Figure 9:
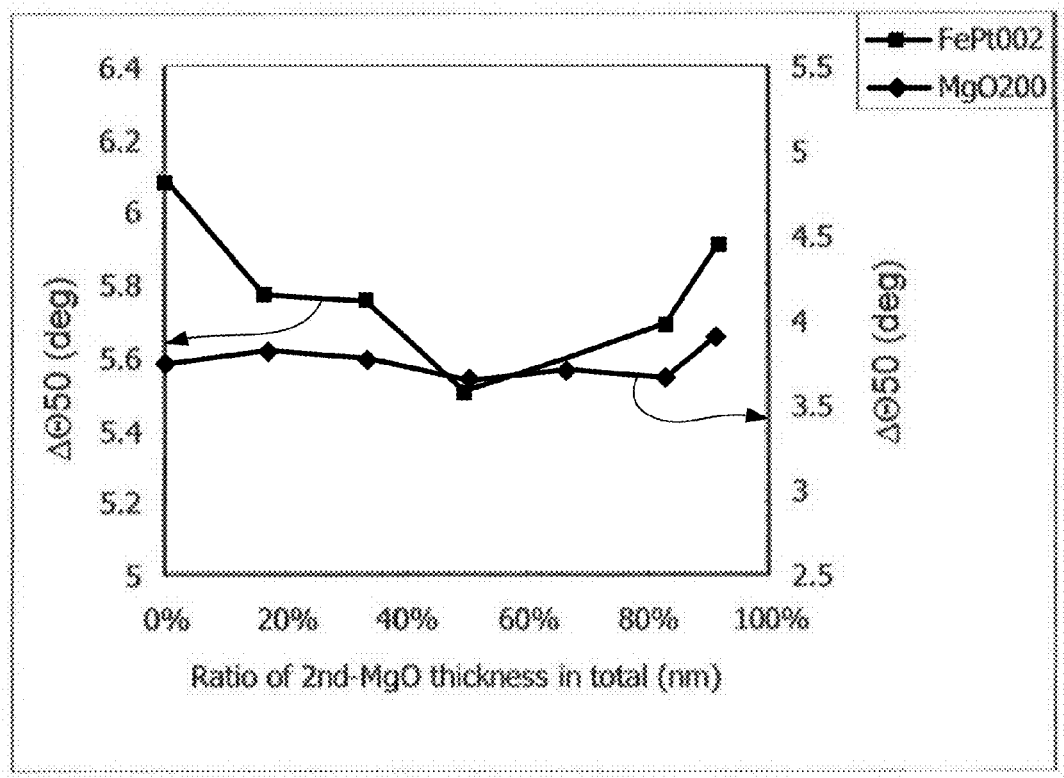
FIG. 9: shows the results of examination of the crystal orientation Δθ50 of the FePt (002) and MgO (200) diffraction peaks, in the case where the film thickness ratio of the first under-layer 103 and the second under-layer 104 was varied, in respect of the under-layer of the perpendicular magnetic recording medium of Embodiment 2.
Figure 10:
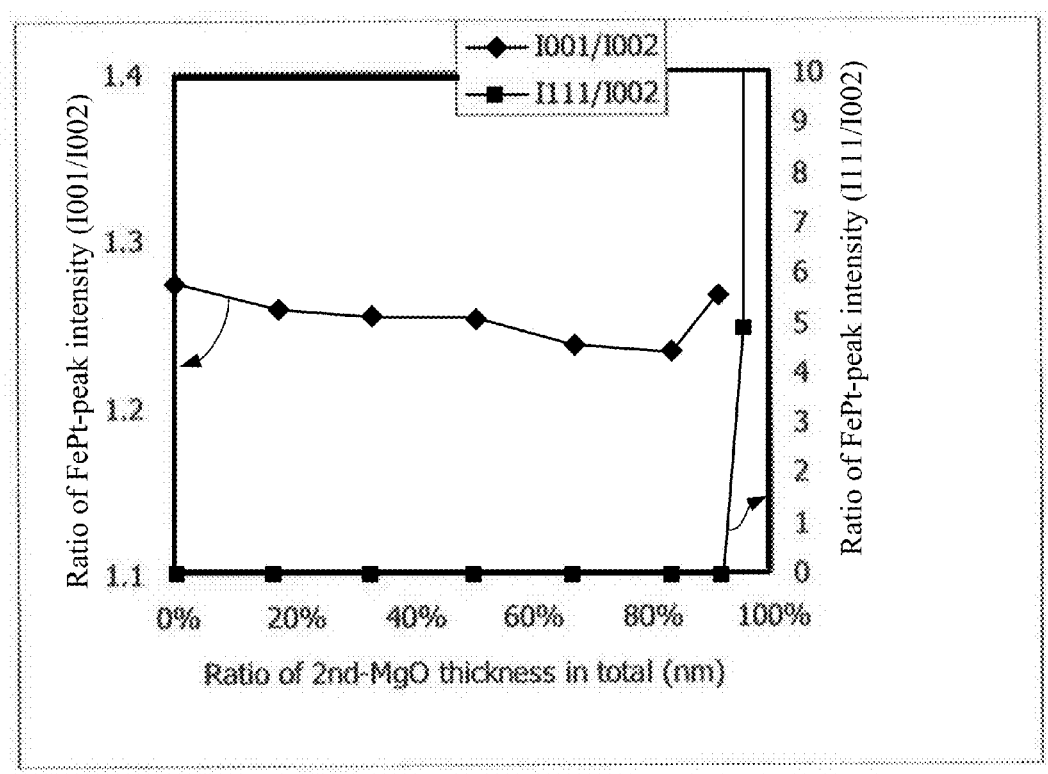
FIG. 10: shows the results of examination of the diffraction peak intensities $I_{001}/I_{002}$ and $I_{111}/I_{002}$ of the FePt, in the case where the film thickness ratio of the first under-layer 103 and the second under-layer 104 was varied, in respect of the under-layer of the perpendicular magnetic recording medium of Embodiment 2.

FIG. 9 shows the results of examining the crystal orientation Δθ50 of the diffraction peaks of FePt (002) and MgO (200), in the case where the film thickness ratio of the first under-layer 103 and the second under-layer 104 is varied, keeping the total film thickness of the first under-layer 103 and the second under-layer 104 constant at about 12 nm. The film thickness ratio of the second under-layer 104 can be defined as $t(2^{nd})/\{t(1^{st}-UL)+t(2^{nd}-UL)\}$. FIG. 10 shows the results of examining the diffraction peak intensity ratios $1_{001}/I_{002}$ and $I_{111}/I_{002}$ of FePt in the case where the film thickness ratio of the first under-layer 103 and the second under-layer 104 is varied, keeping the total film thickness of the first under-layer 103 and the second under-layer 104 constant at about 12 nm. In this way, it can be found that the film thickness ratio of the first under-layer 103 and the second under-layer 104 also has an important effect on the characteristics of the media 100. If the aforementioned film thickness ratio is at least 17% but less than 87%, excellent characteristics can be obtained in that the MgO crystal orientation is less than 3.8°, the FePt crystal orientation is less than 5.8°, and $I_{001}/I_{002}$ is greater than 1.2, while $I_{111}/I_{002}$ is less than 1.

Comparative Examples 3-5

FIG. 11 summarizes the results of the Embodiments and comparative examples 3-5. For the sake of comparison, the FePt (001) crystal orientation and surface roughness evaluation results are summarized for a media having an oxygen lean under-layer and an oxygen rich under-layer, but wherein the order of deposition sequence is altered. Comparison example 3 shows the case of a media having an oxygen lean under-layer located between an oxygen rich under-layer and a recording layer. This arrangement of under-layers results in a media having poor corrosion resistance and which is, therefore, unsuitable for use in a magnetic data recording system.

Comparative example 4 is a case in which an under-layer made of an oxygen rich MgO layer is formed between a buffer layer an oxygen lean under-layer. In this example, if an under-layer made of an oxygen rich MgO layer is formed between a buffer layer and a magnetic recording layer, or between a buffer layer and the first an oxygen lean MgO under-layer, crystal orientation becomes poor, and the product is unsuitable for practical use.

Comparative example 5 shows a case in which the order of the first under-layer 103 made of an MgO layer of lower oxygen concentration and the second under-layer 104 made of an MgO layer of higher oxygen concentration are interchanged. In this case, crystal orientation and surface roughness are both poor, so the product is unsuitable for practical use.

Thus, a beneficial effect is not obtained simply by laminating these two layers, namely, an under-layer made of an MgO layer of lower oxygen concentration and an under-layer made of an MgO layer of higher oxygen concentration: rather, it is important that an under-layer made of an MgO layer of lower oxygen concentration is formed at the interface with the buffer layer and that an under-layer made of an MgO layer of higher oxygen concentration is formed at the interface with the magnetic recording layer.

Embodiment 3, Embodiment 4

The characteristics and evaluation results of these other embodiments are summarized in FIG. 12(a). FIG. 12(b) shows diagrammatically the change of oxygen concentration in the under-layers 103, 104 relative to that of Embodiment 1. FIG. 12(c) shows diagrammatically the change of oxygen concentration in the under-layers of Embodiment 3. FIG. 12(d) shows diagrammatically the change of oxygen concentration in the under-layers of Embodiment 4.

A characteristic feature in these embodiments is that the oxygen concentration is highest in the under-layer at the interface with the FePt layer and is lowest on the interface side of the buffer layer. As in Embodiment 1, it is most straightforward and hence efficient in terms of the mass production process if the under-layer is formed in two layers in stepwise fashion, but excellent crystal orientation and surface roughness can be achieved if, as in Embodiments 3 and 4, more than 2 layers are formed, the oxygen concentration being varied in stepwise fashion.

Details of the layer structure, method of manufacture, materials, and method of evaluation etc which are not set out in this Embodiment were the same as in the case of Embodiments 1, 2 and 5.

Embodiment 5

FIG. 14 shows diagrammatically a magnetic storage apparatus. FIG. 14(a) is a plan diagram thereof, FIG. 14(b) is a cross-sectional view along the line A-A', FIG. 14(c) is a diagram of a head, and FIG. 14(d) is a side view of the of the head.

This device can include: a perpendicular magnetic recording medium 1501; a drive section 1502 that drives the perpendicular magnetic recording medium; a slider 1503 for the magnetic head; an actuator 1504 for moving the slider adjacent to a surface of the magnetic medium 1501; and recording/reproduction signal processing circuitry 1505. The magnetic head can include a magnetic write element 1507 and a magnetic read element 1508 and may also include an energy irradiation element 1506. Near-field light passes through an optical waveguide 1202 that is formed on a suspension 1201 and is supplied to the energy irradiation means 1506 that uses this near-field light. In order to increase positional location precision, the flyability slider 1503 is mounted on a suspension by means of a flexure 1203.

After assembling the medium 100 (FIG. 1) as described above into the aforementioned magnetic recording device, and confirming that the head has a fly height of about 4 nm, recording can be performed using the head. Stable recording/reproduction can be achieved even after storage for a long period, domains being formed of about 25 nm in the linear density direction and 50 nm in the track width direction.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic medium for perpendicular magnetic data recording, comprising:
   an under-layer; and
   a magnetic recording layer formed over the under-layer;
   wherein the under-layer comprises a first layer comprising, as its main component, Mg—O having a first substantially constant, non-zero ratio of O to Mg and a second layer comprising, as its main component Mg—O having a second substantially constant, non-zero ratio of O to Mg, wherein the second ratio is greater than the first ratio, and wherein the second layer is between the first layer and the magnetic recording layer.

2. The magnetic medium as in claim 1 wherein the magnetic recording layer comprises FePt.

3. The magnetic medium as in claim 1 wherein the concentration of oxygen in the under-layer varies in a step wise fashion.

4. The magnetic medium as in claim 1 wherein the oxygen concentration of the Mg—O in the second layer is about 2 atomic percent greater than the oxygen concentration of the Mg—O in the first layer.

5. The magnetic medium as in claim 1 wherein the oxygen concentration of the second layer is less than 5 atomic percent greater than the oxygen concentration of the first layer.

6. The magnetic medium as in claim 1 wherein the oxygen concentration of the second layer is 1 to 5 atomic percent greater than the oxygen concentration of the first layer.

7. The magnetic medium as in claim 6 wherein the first and second layers of Mg—O have substantially equal thicknesses.

8. The magnetic medium as in claim 6 wherein the first and second layers of Mg—O each have a thickness of about 6 nm.

9. The magnetic medium as in claim 6 wherein the thickness of the second layer of Mg—O divided by the combined thicknesses of the first and second layers of Mg—O defines a thickness ratio, and wherein the thickness ratio is 17-87 percent.

10. The magnetic medium as in claim 6 wherein the second layer of Mg—O has an oxygen concentration that is about 2 atomic percent greater than the first layer of Mg—O.

11. The magnetic medium as in claim 6 wherein the second layer of Mg—O has an oxygen concentration that is 1 to 5 atomic percent greater than the first layer of Mg—O.

12. The magnetic medium as in claim 6 wherein the under-layer is formed on an amorphous buffer layer, such that the under-layer is between the buffer layer and the magnetic recording layer.

13. The magnetic medium as in claim 6 wherein the magnetic recording layer comprises magnetic grains separated by non-magnetic boundaries.

14. A magnetic data recording system, comprising:
   a magnetic medium comprising an under-layer and a magnetic recording layer formed over the under-layer, wherein the under-layer comprises a first layer comprising, as its main component Mg—O having a first substantially constant, non-zero ratio of O to Mg, and a second layer comprising, as its main component, Mg—O having a second substantially constant, non-zero ratio of O to Mg, wherein the second ratio is greater than the first ratio, and wherein the second layer is between the first layer and the magnetic recording layer;
   a slider having a magnetic read and write elements formed thereon; and
   an actuator connected with the slider for moving the slider adjacent to a surface of the magnetic medium.

15. The magnetic data recording system as in claim 14 wherein the magnetic recording layer comprises FePt.

16. The magnetic data recording system as in claim 14 wherein the oxygen concentration of the second layer is 1 to 5 atomic percent greater than the oxygen concentration of the first layer.

17. The magnetic data recording system as in claim 14 wherein the first and second layers of MgO have substantially equal thicknesses.

* * * * *